July 23, 1940. F. R. KEMMER 2,208,586
MANUFACTURE OF MAGNESIUM AND OTHER METALS
Filed May 2, 1939

INVENTOR
Frank R. Kemmer
BY
Robert Calvert
ATTORNEY

Patented July 23, 1940

2,208,586

UNITED STATES PATENT OFFICE 2,208,586

MANUFACTURE OF MAGNESIUM AND OTHER METALS

Frank R. Kemmer, Larchmont, N. Y.

Application May 2, 1939, Serial No. 271,274

11 Claims. (Cl. 75—10)

This invention relates to the manufacture of metals and particularly to the electric furnace production of volatile metals from compounds containing them.

It is an object of the invention to produce a metal in such manner as to facilitate its removal from the furnace. It is an object of the invention, also, to produce a metal by electric furnace smelting with a minimum consumption of electrical energy. Another object is to minimize the extent of the reversal of the reaction by which a volatile metal is liberated from the charge originally supplied to the furnace. A further object is to decrease the entrainment of dust particles by the vapor of the volatile metal. Other objects and advantages will appear from the detailed description that follows.

The invention comprises introducing into a furnace a charge of composition adapted on heating to liberate the desired metal, providing within the charge a fluid-permeable core, heating the charge and core to form fluid metal, and withdrawing the metal from the furnace and preferably through the core. In the preferred embodiment, the invention comprises producing a volatile metal from such an assembly in the furnace, vaporizing the metal while maintaining the core at a higher temperature than the surrounding charge, distilling from the furnace the vapor of the volatile metal, and then condensing the vapor. The invention comprises, also, condensing the vapor of the volatile metal in a molten metal of very high boiling point.

The invention will be illustrated by description in connection with the attached drawing to which reference is made.

There are shown in the figures an electric furnace, of wall 7 including a refractory inner lining and an outer retaining shell of metal.

Within the furnace is the charge 8 of chemical composition adapted to produce on heating the vapor of the metal that it is desired to manufacture. As may be seen, the main charge 8 is disposed in a generally annular form, around a core 9 that, preferably, is more or less centrally placed. In the preferred embodiment of the invention, this core is of average specific electrical conductance greater than that of the surrounding charge and also substantially more permeable to fluid metal, that is, metal in the form of liquid or vapor.

The core and surrounding charge may extend from the upper part of the furnace to the bottom thereof, the bottom being provided with clean-out openings 10 through which material not consumed in passing downward through the furnace may be removed by a rake or by other conventional mechanical device (not shown).

The charge and core are suitably of like chemical composition, by which is meant the fact that they include the same materials.

Figure 1:
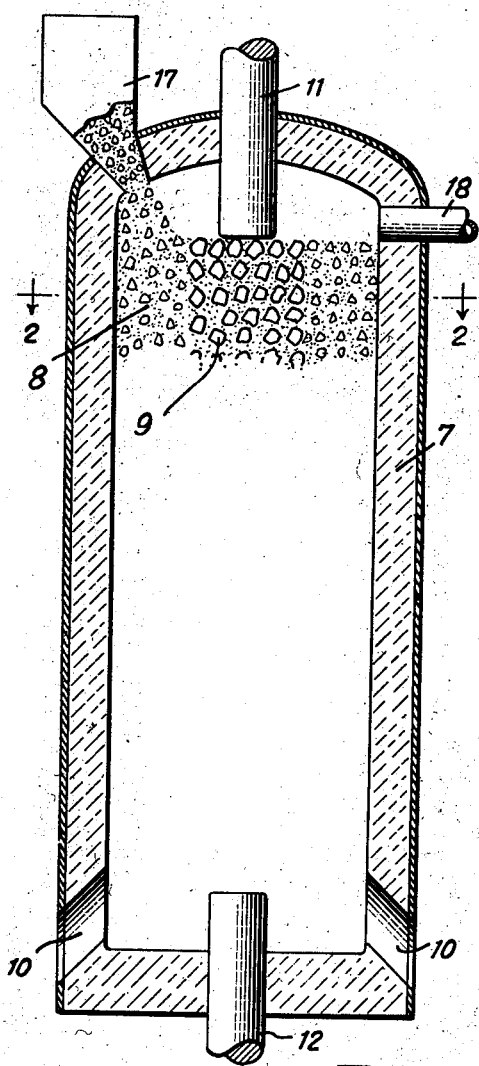
Fig. 1 is a vertical view partly sectional and partly diagrammatic, of a furnace and connection to condenser for use in the practice of the invention.
Figure 2:
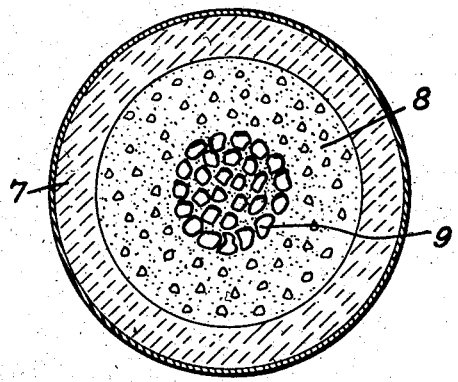
Fig. 2 is a sectional view on line 2—2 of Fig. 1.

The electrodes are indicated at 11 and 12. They may be the usual shape-retaining conducting masses, such as those consisting largely of amorphous carbon or graphite, and may be arranged in any suitable position, in accordance with commercial practice, so long as the current delivered by them passes through the charge and core in the general direction required by the arrangement shown in Fig. 1. When the current is so directed, the core and surrounding charge constitute in effect approximately parallel conductors.

Figure 4:
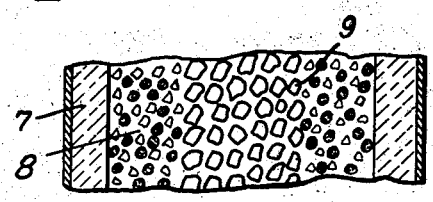
Fig. 4 is a vertical sectional view of a portion of the charge and furnace wall of Fig. 1.

The lower electrode may be made hollow as shown in Fig. 4, preferably with a generally T-shaped opening 13 permitting the introduction of a gas from below while preventing the passing of furnace charge downward into the opening.

Advantageously, the charge 8 comprises a mixture of a compound containing an oxide of the metal to be made and a reducing agent therefor. A suitable reducing agent is a carbonaceous material, coke being preferred. Other carbonaceous materials that may be used are petroleum coke, charcoal or graphite. However, graphite is too expensive ordinarily and its use is not justified. For best results the reducing agent used should be a relatively good conductor of electricity, when the agent is in the form of small lumps or granules.

The core material 9 may be of the same general composition as that of the charge 8 except that the core material should be of higher average specific electrical conductance and preferably also of greater permeability. This higher conductance and permeability are obtained in any suitable manner, as, for instance, by increasing the proportion of conducting carbonaceous material to the metal oxide containing compound, by omitting the latter entirely, or by using the carbonaceous material in the form of particles of larger average size than those in the surrounding charge. As an example, I may use in the core 9 carbonaceous material in the form of lumps approximately ½ to 1 inch in longest dimension, whereas the carbonaceous material in the surrounding charge may be ⅓ inch or smaller. For relatively small furnaces, the size of pieces of conducting carbonaceous material in the core and in the charge may be smaller. Thus, coke particles may be used in the core of size to pass through a screen having 3 to 10 meshes per linear inch, whereas the charge 8 may contain coke particles of average mass about half or somewhat less than half of that of the particles of coke in the core.

Illustrative data showing the effect of particle size on conductance measured under comparable conditions is given below for calcined petroleum coke particles screened to various mesh sizes.

| Mesh size | Average specific electrical conductance |
|---|---|
| Through 20, on 35 | [1] 100 |
| Through 35, on 65 | 77 |
| Through 65, on 100 | 69 |
| Through 100, on 150 | 62 |
| Through 150, on 200 | 59 |

[1] Taken as standard.

Figure 3:
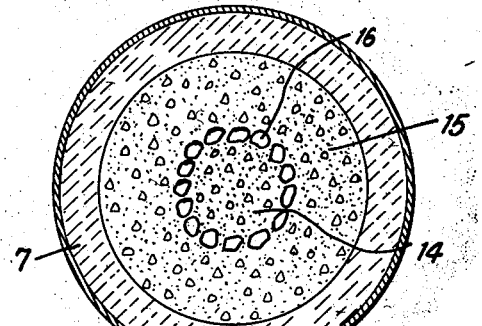
Fig. 3 is a similar sectional view of a modified arrangement of the charge and core.

When the materials are arranged as shown in Fig. 3, then one portion 14 and another portion 15 of the charge to be smelted are placed both within and without the cylindrical core 16. Except for shape and arrangement, the core and charge are constituted as previously described.

In arranging the materials within the furnace in the manner described, it is not necessary to form accurate ring-shaped or cylindrical portions. The charge 8 may be delivered around the edges of the furnace, as by a shovel or through charging chutes of the type shown at 17. As the charge is so placed around the outside of the furnace, core material is introduced, say, by shovel or chute (not shown), or otherwise into the central portion of the furnace. The charge and the core material during all stages of the filling are maintained sufficiently close to the same level that movement of one into the zone reserved for the other is minimized.

When used in the manufacture of a high boiling metal such as tin or lead, the furnace is provided with a bottom outlet of conventional type (not shown).

The invention gives especially desirable results in the production of volatile metals, and, for that reason, will be more particularly described in connection with such use.

The furnace is provided with a vapor outlet. This outlet is in communication with the core 9 or 16, so that vapor may pass through the core and outlet, and thus from the furnace.

Figure 6:
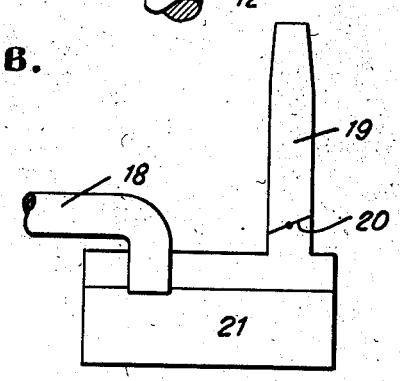
Fig. 6 is an elevational view of the condenser, partly in section.
Figure 5:
Fig. 5 is a longitudinal sectional view of a modified form of lower electrode.

The vapor, passing through the outlet 18 is led directly to the condenser (Fig. 6). The condenser 21 in turn is provided with an outlet in the form of a short stack 19 and a damper 20 therefor.

Particularly satisfactory results are obtained when the vapors are passed into a molten metal layer 21 maintained at a temperature below the boiling point (condensation point) of the volatile metal to be condensed. The metal used to effect the condensation should be very high boiling, so as to have no substantial vapor pressure at the boiling point of the metal to be condensed. Examples of such high boiling metals that may be used for the condensation of the volatile metals are lead, aluminum, copper, tin, and nickel.

In general, the operation is as follows:

The charge and core are heated to a high temperature adapted to cause production of the volatile metal and its vaporization. In all cases, the temperature is at least as high as the boiling point of the volatile metal under the prevailing pressure. The extent if any to which the temperature must be carried above this point to liberate the metal is well known for various conventional compositions of charge and may be readily determined by a few tests for any composition not heretofore used.

The core is maintained preferably at a substantially higher temperature than the main charge. Maintaining a higher temperature in the core than in the charge causes the reduction of the metal oxide to begin first within or adjacent to the core and then to progress away therefrom. There is thus opened up vapor passages, so that blowing of the metal vapor through closely compacted and partly dusty material is obviated. Generation or entrainment of dust by the metal vapor is, therefore, greatly reduced. Because the temperature decreases from the core to the furnace wall, there is minimized heat loss, with important saving in electrical energy used.

The invention will be illustrated more specifically by description in connection with the manufacture of magnesium.

Magnesium oxide is mixed with coke as uniformly as possible.

The amount of coke used is in excess of that calculated to reduce the magnesium oxide, with the production of magnesium metal and carbon monoxide. A suitable proportion is 75 to 200 parts by weight of coke for 100 parts of magnesium oxide.

Since the core is maintained at a substantially higher temperature than the charge 8, the vapor of the magnesium is superheated before passage to the condenser. The extent of the reaction $$Mg + CO \rightleftharpoons MgO + C$$

is thus minimized, inasmuch as very high temperatures tend to prevent the reaction of magnesium vapor with carbon monoxide, to give magnesium oxide and carbon.

It will be understood that the portion of the vapor which passes through the core is blended with additional vapor coming directly from the charge, as the vapor passes to the condenser. In this manner, the relatively very hot vapor from the core superheats the vapor from the charge. 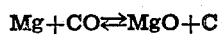

The coke should be in the form of particles of size described above for making mixtures for the charge and core, respectively.

In one modification, the core may contain coke in proportion to the magnesium oxide 5 to 50% greater than that prevailing in the main charge. In this case, the coke particles may be of about the same average size in the core and charge.

The line of division between the core and charge need not be sharply defined. The outer surface of the core may be and usually is highly irregular. The core and charge may be intermingled at their adjacent edges.

The diameter of the core may be varied. It should be sufficiently large to form a continuous zone or continuous pillar through the charge. For a typical furnace of 2 to 6 feet internal diameter and 10 to 30 feet height, the core is suitably about 3 to 15 inches in average diameter. In general, the size of the core may be reduced, as its conductivity is increased, by choice of composition of the core. For some purposes the core may be very narrow and irregular, so long as it forms a continuous line of high conductivity between the electrodes.

When the furnace has been filled, say to about two-thirds or more of its depth, the electric current is passed through, from the electrodes contacting with the upper and lower ends of the charge and core within the furnace.

Since the core and charge are in good electrical contact with each other, the current in passing through the furnace distributes itself between the two conductors, the core and the charge, so that the current density and attendant heating effect is greater in the core than in the charge, since the average specific conductance of the former is the greater.

The charge is thus raised to a temperature at which the magnesium oxide and carbon react, to give magnesium vapor.

The core will be at a substantially higher temperature than, say, 100 to 800° C. above the average temperature of the charge.

The resulting magnesium vapor and carbon monoxide pass through the core to a large extent, from the furnace to the vapor outlet, and then to the condenser.

Lead is suitable for use as the layer of molten metal in the condenser. For best results, the lead is maintained at a temperature between 550° C. and 1050° C. At higher temperatures, complete condensation of the vapors of magnesium (boiling point 1110° C.) is difficult. At lower temperatures, less magnesium may be dissolved in the lead.

The magnesium so condensed and dissolved in the lead may be recovered in part by crystallization as the solution of the two metals is allowed to cool, advantageously to a temperature near the freezing point of the eutectic mixture. An alloy containing originally about 50 parts by weight of dissolved magnesium for 100 parts of lead, in cooling from 550° to 450° C., will show separation of approximately a third of the magnesium as crystals. The alloy separated from the crystals is then distilled, as described below, to produce a second fraction of magnesium.

For most purposes, the crystallization step may be omitted and the condenser liquid and dissolved magnesium subjected directly to distillation, to volatilize the magnesium and thus separate it from the lead which is substantially non-volatile at the boiling point of magnesium.

The distillation is preferably made through a rectifying column of type that is conventional for distilling zinc or like metal. Also, the distillation may be effected in a stream of inert gas, such as hydrogen or methane, or in a partial vacuum.

In place of lead in the above described steps there may be substituted one of the other metals recited above as suitable for the purpose. The metal selected must during the condensation be maintained at a temperature above the melting point and well below the boiling point of magnesium. The molten metal may be made nearly, or quite saturated with magnesium and then cooled, to deposit crystals of magnesium, preliminary to distillation.

For some purposes, the use of a molten metal for condensing the magnesium vapor may be substituted by the usual condensation by shock cooling, cold hydrogen or other inert material such as oil being contacted with the hot vapor of magnesium. The material so obtained is magnesium powder.

In any case the resulting material, either the powder or the megnesium dissolved in another metal, should be rectified if magnesium of nearly pure form is desired. The distilled magnesium is of outstanding properties; as compared to commercial magnesium, my product has greater elongation at break, higher strength, and increased resistance to corrosion in air.

Other typical compounds of volatile metals that may be substituted for the magnesium oxide in the furnace charge and core and treated as described, to vaporize the metal are the following: Magnesium carbonate, cadmium oxide or carbonate, and zinc oxide or carbonate, as well as reducible compounds of non-oxidic type.

In making relatively non-volatile (very high boiling metals) corresponding compounds of such metals as tin, lead, or copper are substituted for the volatile metal compounds. The process used is that described except that volatilization and condensation are omitted and the metal in liquid form is drawn from the bottom of the furnace, through a conventional type of outlet (not shown).

Various reducing agents may be used, as, for example, aluminum, ferrosilicon, calcium carbide or silicide, and silicon carbide. Such reducing agents may be substituted for an equivalent weight of the carbonaceous reducing agents used in the above examples. In any case, however, there is used a large proportion of coke or the like to serve as conductor when electrical resistance heating is employed.

In place of such compositions including (1) a compound providing a metal oxide on heating and (2) a carbonaceous reducing material, there may be substituted, also, an alkali or alkaline earth metal chloride and calcium carbide or a mixture of calcium carbide and an alkaline earth metal silicide. The reducing agent, here calcium carbide, should be used in excess of the amount calculated to reduce the compound of the metal to be made.

In one embodiment of the invention, magnesium and calcium aluminate are produced simultaneously. For this purpose, aluminum as the reducing agent, as, for example, in the form of powder or foil, is heated with a source of both magnesium oxide and calcium oxide. Thus, there may be used a mixture of calcined limestone and magnesite or calcined dolomite. The magnesia compound is used in amount approximately equivalent chemically to the aluminum present. When heated to the temperature of liberation and distillation of magnesium, the lime present will be largely unreduced. When heated to a higher and sintering temperature, calcium aluminate is formed. This product is useful in making a calcium aluminate cement or as a raw material from which high grade alumina may be made.

The furnace and method described, may be utilized to redistill magnesium powder, which, as ordinarily obtained, is impure. The powder is charged in place of magnesium oxide and is part of material 8, around the core 9 consisting largely of coke, graphite, or the like. The core 9 may contain admixed magnesium powder.

Current is supplied through the electrodes, to distill the magnesium. The vapors may then be condensed in a manner previously recited.

The electrodes may be positioned in the furnace otherwise than as shown, say, in other conventional manner. Thus, they may extend through the wall of the furnace, one electrode near the upper level of the charge in the furnace and the other near the bottom of the charge. In such case, contact between the core and electrode may be established through the conducting material of charge 8. Also, in place of a single pair of electrodes, a greater number of electrodes may be used, to accommodate polyphase current, in accordance with usual practice.

The materials of the core 9 and charge 8 (Fig. 1) may be briquetted. Thus there may be used briquettes containing the metal oxide supplying raw material and reducing agent therefor, along with additional material such as coke particles or the like disposed around the briquettes.

The operations described are preferably conducted in a continuous manner. In that event, the core and charge will be in a movement as descending columns. When the operation is continuous, the charge and core materials are fed to the top part of the furnace continuously or at small intervals of time.

It will be understood that the details given are for the purpose of illustration, not restriction, and that variations within the spirit of the invention are intended to be included within the scope of the appended claims.

I claim:

1. In the manufacture of a metal, the method which comprises introducing into a furnace a charge of ore to be reduced and a reducing agent adapted on being heated to produce the metal in fluid form, disposing within the charge a core including the said ore and reducing agent and being of greater average permeability to fluid than the said charge, heating the charge to liberate the fluid metal, maintaining the core at a higher temperature than the surrounding charge, and withdrawing the metal through a portion of the core and then from the furnace.

2. In the manufacture of a volatile metal, the method which comprises introducing a charge of ore to be reduced and reducing agent, adapted to produce the volatile metal on heating, into an electric resistance furnace provided with an outlet for vapor, disposing within the charge an upright vapor-permeable core, including the said ore and reducing agent, in communication with the outlet to the furnace and of average specific electrical conductance substantially greater than that of the charge, passing a current of electricity through the charge and core in such direction that the core and charge constitute approximately parallel conductors, whereby the core is caused to have a higher temperature than the surrounding charge, vaporizing the volatile metal produced, passing the resulting vapor through the said outlet and from the furnace, and then condensing the said vapor, the said charge extending to the upright interior wall of the furnace, so that the temperature within the furnace during vaporization of the metal is highest in the said core and lowest in the material adjacent to the said wall of the furnace.

3. In the manufacture of a volatile metal, the method which comprises introducing into an electric resistance furnace a charge of composition adapted to produce the volatile metal on heating and extending to the upright interior wall of the furnace, providing within, generally centrally of the charge, and in contact therewith a core of average specific electrical conductance and permeability to vapor substantially greater than that of the charge, passing a current of electricity through the charge and core in such direction that the core and charge constitute approximately parallel conductors, whereby the core is caused to have a higher temperature than the surrounding charge, vaporizing the volatile metal produced, passing the resulting vapor through the said core and from the furnace, and then causing condensation of the vapor.

4. In the manufacture of magnesium metal, the method which comprises vaporizing the metal in a furnace, maintaining a supply of a molten metal at a temperature below the vaporizing point of the magnesium, delivering the vaporized magnesium from the furnace to the said molten metal, so that the magnesium vapor is condensed in the molten metal, and then redistilling the magnesium from the said molten metal, the molten metal having substantially no vapor pressure at the temperature of boiling of the magnesium.

5. In the manufacture of magnesium, the method which comprises forming a mixture of a magnesium oxide bearing material and a reducing agent containing carbon, placing the said mixture as an outer and generally annular layer in an electric resistance furnace, disposing within the said layer a core of substantially greater average specific electrical conductance than the said mixture, passing an electric current through the core and mixture in such direction that the core and mixture constitute approximately parallel conductors, vaporizing the magnesium produced, passing the resulting vapor from the furnace, and then condensing the vapor.

6. In the manufacture of a volatile metal, the method which comprises forming a mixture of a material bearing the oxide of the metal and a carbonaceous reducing agent therefor, placing the said mixture in a furnace, disposing within the said layer a vapor-permeable core, heating the charge and core to a high temperature to produce and vaporize the metal, maintaining the core at a higher temperature than the said charge, passing the metal vapor through the core and from the furnace, and then condensing the vapor.

7. In the manufacture of magnesium, the method which comprises forming a mixture of a magnesium oxide bearing material and coke, placing the said mixture as an outer and generally annular layer in an electric resistance furnace, disposing within the said layer a core of material containing coke of larger average size of pieces and of substantially greater average specific electrical conductance than the said mixture, passing an electric current through the core and mixture to produce magnesium, vaporizing the magnesium produced, passing the resultant vapor from the furnace, and then condensing the vapor.

8. In the manufacture of magnesium, the method which comprises forming a mixture of a magnesium oxide bearing material and carbonaceous material, placing the said mixture as an outer and generally annular layer in an electric resistance furnace, disposing within the said layer a core of like materials but of substantially greater average specific electrical conductance and greater permeability to vapor than the said mixture, passing an electric current through the core and mixture in such direction that the core and mixture constitute approximately parallel conductors, to produce magnesium, vaporizing the magnesium produced, passing the resulting vapor from the furnace, and then condensing the vapor.

9. In making magnesium, the method which comprises liberating magnesium from a magnesium containing compound, separating the liberated magnesium from remaining portions of the said compound, vaporizing the magnesium at a temperature above its melting point, rectifying the resulting vapor, and then condensing the rectified vapor to liquid form.

10. In the manufacture of magnesium, the method which comprises condensing magnesium vapor in a molten metal of no substantial vapor pressure at the boiling point of magnesium and adapted to dissolve magnesium, to form a concentrated solution, cooling the solution to separate crystals of magnesium therefrom, and separating magnesium from the remaining liquid alloy by distillation.

11. In the manufacture of a metal, the method which comprises introducing into a furnace a charge of composition adapted on being heated to produce the metal in fluid form, disposing within the charge an upright permeable core, heating the charge to liberate the fluid metal, maintaining the core at a higher temperature than the surrounding charge, and withdrawing the metal from the furnace through an outlet at a level above the upper end of the upright core.

FRANK R. KEMMER.